US011742645B2

(12) United States Patent
Raymond et al.

(10) Patent No.: US 11,742,645 B2
(45) Date of Patent: Aug. 29, 2023

(54) METHOD OF PROVIDING ACCESS THROUGH A FLOOR TILE

(71) Applicant: RAYMOND & LAE ENGINEERING, INC., Fort Collins, CO (US)

(72) Inventors: Donald M. Raymond, Fort Collins, CO (US); Jeremy D. Swanner, Fort Collins, CO (US); Timothy L. Hirschenhofer, Fort Collins, CO (US); James M. Schneider, Fort Collins, CO (US)

(73) Assignee: Raymond & Lae Engineering, Inc., Fort Collins, CO (US)

( * ) Notice: Subject to any disclaimer, the term of this patent is extended or adjusted under 35 U.S.C. 154(b) by 0 days.

(21) Appl. No.: 18/118,244

(22) Filed: Mar. 7, 2023

(65) Prior Publication Data
US 2023/0208125 A1 Jun. 29, 2023

Related U.S. Application Data

(62) Division of application No. 17/119,811, filed on Dec. 11, 2020, now Pat. No. 11,626,716.

(51) Int. Cl.
*H02G 3/22* (2006.01)
*E04F 15/024* (2006.01)

(52) U.S. Cl.
CPC ......... *H02G 3/22* (2013.01); *E04F 15/02405* (2013.01)

(58) Field of Classification Search
CPC ...... H02G 3/22; H02G 3/185; E04F 15/02405
See application file for complete search history.

(56) References Cited

U.S. PATENT DOCUMENTS

| 3,053,564 | A | * | 9/1962 | Evans | B60J 5/04 439/31 |
| 3,633,250 | A | * | 1/1972 | Romney | F16B 7/0446 403/233 |
| 4,857,672 | A | * | 8/1989 | Rebers | G02B 6/4444 174/92 |
| 4,889,298 | A | * | 12/1989 | Hauff | F16L 5/08 174/503 |
| 5,981,877 | A | * | 11/1999 | Sakata | B60R 16/0222 439/567 |
| 6,152,767 | A | * | 11/2000 | Roosen | H02G 15/013 439/587 |
| D443,811 | S | * | 6/2001 | Tisbo | D8/356 |
| 6,278,060 | B1 | * | 8/2001 | Mori | H02G 3/0475 174/152 G |

(Continued)

*Primary Examiner* — Timothy J Thompson
*Assistant Examiner* — Rhadames Alonzo Miller
(74) *Attorney, Agent, or Firm* — Cochran Freund & Young LLC; William W. Cochran

(57) ABSTRACT

Disclosed are embodiments of a round floor grommet and a rectangular floor grommet. These floor grommets can be constructed in any desired shape other than round or rectangular. Frame portions that hold foam pieces are joined together to form a primary slit in the floor grommet. Cross slits can also be formed in the foam material. The foam is a semi-closed cell foam that is constructed from PVC and nitrile butadiene rubber which has superior sealing effects since the foam can conform around objects passing through the slits in the floor grommet and seal any flow of air through the slits.

7 Claims, 18 Drawing Sheets

(56) References Cited

U.S. PATENT DOCUMENTS

| | | | | |
|---|---|---|---|---|
| 6,497,414 B1* | 12/2002 | Roosen | H02G 15/013 | 277/316 |
| 6,660,937 B1* | 12/2003 | Macleod | H02G 3/22 | 174/152 G |
| D559,660 S * | 1/2008 | DeCosta | D8/356 | |
| 8,347,906 B1* | 1/2013 | Ismert | E04G 15/061 | 4/293 |
| 8,791,376 B2* | 7/2014 | Endt | H02G 3/22 | 174/650 |
| 8,969,741 B2* | 3/2015 | Aldrich | H02G 3/083 | 174/653 |
| 9,109,357 B2* | 8/2015 | Moreno | E04B 1/98 | |
| D754,078 S * | 4/2016 | Baldwin | D13/156 | |
| 10,573,436 B2* | 2/2020 | Coyle | H01B 17/586 | |
| 10,969,037 B2* | 4/2021 | Vaughn | F16L 5/00 | |
| D924,813 S * | 7/2021 | Bailey | D13/155 | |
| 2001/0008330 A1* | 7/2001 | Sakata | B60R 16/0222 | 277/316 |
| 2002/0038492 A1* | 4/2002 | Hashimoto | F16L 5/10 | 16/2.1 |
| 2002/0129958 A1* | 9/2002 | Petri | H02G 3/088 | 174/546 |
| 2003/0010566 A1* | 1/2003 | Miyakawa | F02M 35/10301 | 181/204 |
| 2003/0014924 A1* | 1/2003 | Nakamura | B60R 13/0846 | 52/1 |
| 2003/0015339 A1* | 1/2003 | Sato | B60R 16/0222 | 174/668 |
| 2003/0079897 A1* | 5/2003 | Sempliner | F16L 5/00 | 174/650 |
| 2004/0140118 A1* | 7/2004 | Nishimoto | H02G 3/22 | 174/650 |
| 2004/0154819 A1* | 8/2004 | Sakata | B60R 16/0222 | 174/650 |
| 2005/0076469 A1* | 4/2005 | Tisbo | H02G 3/083 | 16/2.1 |
| 2005/0140075 A1* | 6/2005 | Mishima | F02B 77/13 | 267/140.11 |
| 2006/0185875 A1* | 8/2006 | Habel | H02G 3/22 | 174/50 |
| 2007/0246613 A1* | 10/2007 | Kennedy | H02G 3/32 | 248/56 |
| 2008/0017401 A1* | 1/2008 | Uchida | H02G 3/22 | 174/153 G |
| 2008/0220659 A1* | 9/2008 | Ikeya | H01R 13/5213 | 439/701 |
| 2009/0000861 A1* | 1/2009 | Hikami | F01N 13/102 | 181/200 |
| 2009/0028659 A1* | 1/2009 | Shibuya | F16B 21/073 | 411/57.1 |
| 2009/0056230 A1* | 3/2009 | Flendrig | B60R 16/0215 | 49/502 |
| 2009/0065235 A1* | 3/2009 | Uchibori | B60R 16/0222 | 174/152 G |
| 2010/0176533 A1* | 7/2010 | Hayashi | B29C 45/14418 | 264/252 |
| 2010/0307817 A1* | 12/2010 | Roy | H02G 3/185 | 174/666 |
| 2010/0314158 A1* | 12/2010 | Suzuki | H02G 3/22 | 174/152 G |
| 2011/0073350 A1* | 3/2011 | Okuhara | B60R 16/0222 | 174/152 G |
| 2011/0247172 A1* | 10/2011 | Yoshii | F16B 21/073 | 16/2.1 |
| 2012/0193140 A1* | 8/2012 | Briere | H02G 3/22 | 174/650 |
| 2012/0211262 A1* | 8/2012 | Agusa | B60R 16/0222 | 174/152 G |
| 2012/0217041 A1* | 8/2012 | Agusa | B60R 16/0222 | 174/153 G |
| 2012/0223489 A1* | 9/2012 | Curtin | H02G 3/185 | 277/627 |
| 2012/0252272 A1* | 10/2012 | Omae | H01R 13/506 | 439/607.01 |
| 2013/0008693 A1* | 1/2013 | Okuhara | F16L 5/10 | 174/152 G |
| 2013/0199823 A1* | 8/2013 | Kanai (Popovici) | H02G 3/22 | 174/152 G |
| 2013/0307225 A1* | 11/2013 | Boyd | H02G 3/185 | 277/626 |
| 2014/0060947 A1* | 3/2014 | Braun | B23P 11/00 | 16/2.2 |
| 2014/0231133 A1* | 8/2014 | Fritz | G21C 17/116 | 174/650 |
| 2015/0041210 A1* | 2/2015 | Inao | B60R 16/0215 | 174/72 A |
| 2015/0285408 A1* | 10/2015 | Cox | F16L 5/14 | 277/628 |
| 2016/0134090 A1* | 5/2016 | Kushima | H05K 9/0098 | 174/362 |
| 2017/0179703 A1* | 6/2017 | Kominato | H01B 7/0045 | |
| 2017/0219100 A1* | 8/2017 | Kobayashi | F16J 15/3204 | |
| 2017/0234434 A1* | 8/2017 | Shuto | F16J 3/04 | 277/504 |
| 2017/0349123 A1* | 12/2017 | Katoh | H01B 17/583 | |
| 2018/0128400 A1* | 5/2018 | Twelves | H02G 15/013 | |
| 2018/0145430 A1* | 5/2018 | Yanai | H01R 4/70 | |
| 2018/0342830 A1* | 11/2018 | Mizuno | H01R 13/5205 | |
| 2019/0089142 A1* | 3/2019 | Sugino | H02G 3/34 | |

* cited by examiner

METHOD OF PROVIDING ACCESS THROUGH A FLOOR TILE

CROSS-REFERENCE TO RELATED APPLICATIONS

The present U.S. Utility Application claims priority pursuant to 35 U.S.C. § 120 as a divisional of U.S. Utility Application No. 17/119,811, entitled, "FLOOR GROMMET," filed on Dec. 11, 2020, and is incorporated herein by reference in its entirety and made part of the present U.S. Utility Application for all that it discloses and teaches.

BACKGROUND

Floor grommets are useful for allowing cables, conduits, pipes and other items to pass through a raised floor system and restrict the flow of conditioned air from the plenum of the raised floor system to a computer room above the raised floor system. Typical floor grommets retain, or at least partially retain, air within the plenum and restrict or substantially restrict flow of air from the plenum into a computer room.

U.S. Design Application No. 29/718,184, entitled, "Rectangular Floor Grommet," filed on Dec. 20, 2019 and issued on Mar. 22, 2022 as U.S. Design Pat. D946,380, as well as U.S. Design Application No. 29/718,188, entitled, "Round Floor Grommet" filed on Dec. 20, 2019 and issued on Mar. 22, 2022 as U.S. Design Pat. D946,381, are specifically incorporated herein by reference for all that they disclose and teach.

SUMMARY

A method of providing access through a floor tile of a raised floor system to allow passage of cables between a plenum and a computer room while restricting the flow of air comprising: providing a frame having a first section and a second section; attaching a first foam member to the first section, the first foam member comprising a polymerized blend of polyvinylchloride and nitrile butadiene rubber that is foamed and treated to form a semi-closed foam; attaching a second foam member to the second section, the second foam member comprising a polymerized blend of polyvinylchloride and nitrile butadiene rubber that is foamed and treated to form a semi-closed foam.

DETAILED DESCRIPTION OF THE EMBODIMENTS

Figure 1:
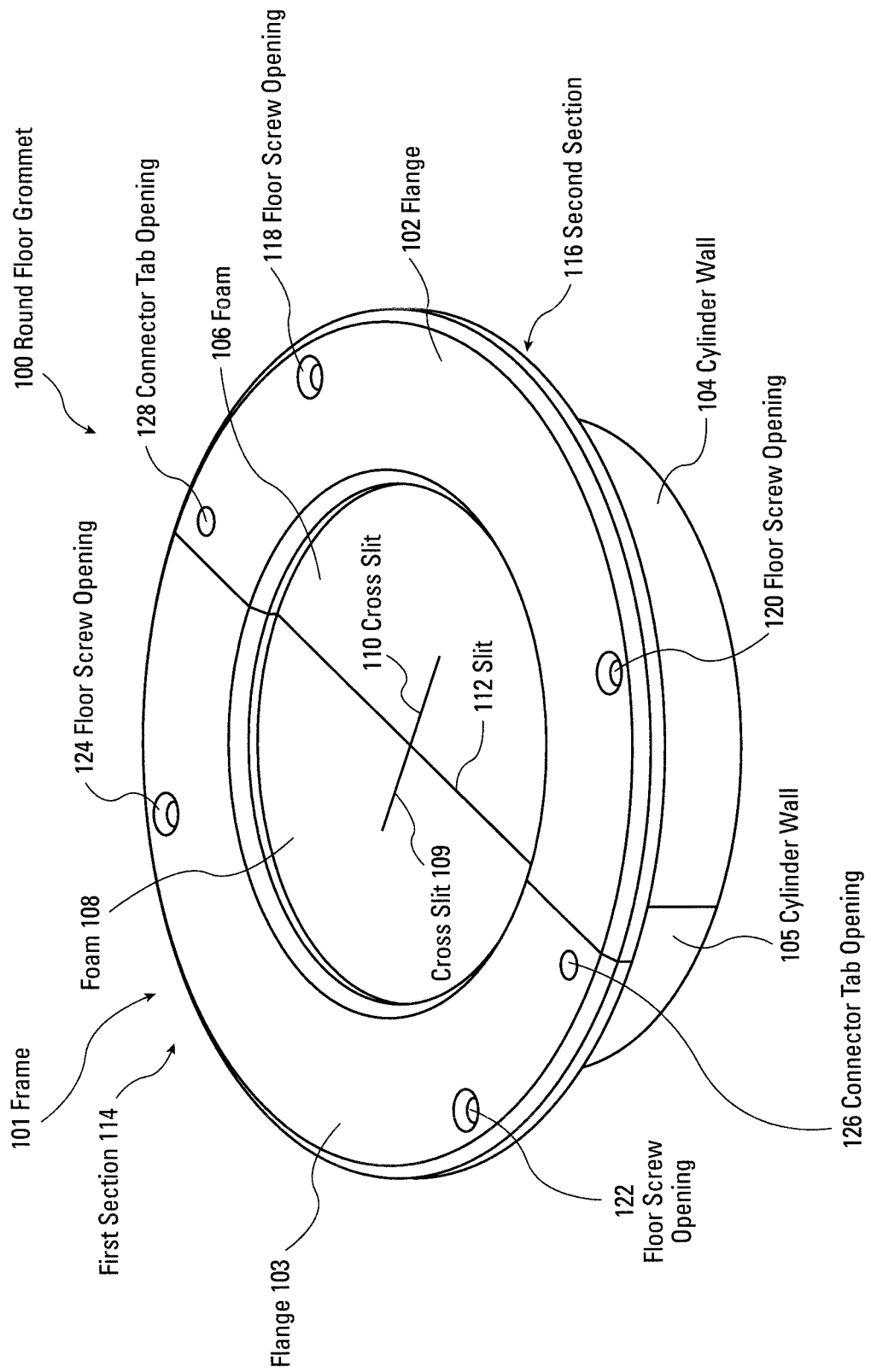
FIG. 1 is a top isometric view of an embodiment of the present invention.

FIG. 1 is a top isometric view of an embodiment of a round floor grommet 100 of the present invention. As illustrated in FIG. 1 the round floor grommet 100 comprises of a frame 101 and two foam members 106, 108. The frame 101 has two sections, a first section 114 and a second section 116. These two sections are joined together as illustrated in FIG. 1. The joining of the first section 114 and the second section 116 of the frame 101, with foam member 106 and foam member 108 mounted in the frame, causes the foam members to press together and form the slit 112. A cross slit 110 is formed in foam member 106 and a cross slit 109 is formed in foam member 108 by cutting or similar process. When the foam members 106, 108 are pressed together, as a result of the first section 114 and the second section 116 of the frames 101 being pressed together, the cross slits 109, 110 generally align with each other. Although two cross slits 109, 110 are shown, any desired number of cross slits can be used. The cross slits help to seal larger objects that are inserted at a cross point of the cross slits and slit. When cross slits are used, there are four surfaces that can be deflected which provides for better conformance of the foam around objects inserted at the cross point.

As additionally shown in FIG. 1, the first section 114 of frame 101 includes a flange 103 and a cylinder 105. Generally, the flange 103 and the cylinder 105 comprise a single structure that is molded by an injection molding process. Other forms of molding can be used. However, the flange 103 and cylinder 105 are normally constructed to be a single unitary piece. In some embodiments, however, the cylinder 105 can be attached to the flange 103 by various methods including ultrasonic welding, bonding techniques or other welding or bonding methods. The same is true for the second section 116 and the cylinder wall 104 which also form a unitary structure. A series of floor screw openings 118, 120, 122, 124 are formed in the frame 101 either during the molding process or subsequent to the molding process. The floor screw openings 118-124 provide an opening to mount the frame 101 in a tile of a raised floor section. Connector tab openings 126, 128 are openings that are engaged by connector tabs that are disclosed in FIG. 4.

As also shown in FIG. 1, the foam pieces 106, 108 are made from semi-open cell foam that is a super soft PVC/NBR crushed foam. The foam pieces 106, 108 are constructed from a polymerized blend of polyvinylchloride and nitrile butadiene rubber. Other polymerization blends can be used such as a polymerized blend of polyvinylchloride, nitrile butadiene rubber, and polychloroprene. In that regard, the polymerized blend should at least include polyvinylchloride and nitrile butadiene rubber while other components can be added to the polymerized blend. This type of foam is used in many automotive applications and a suitable foam is sold by Armacell LLC located at 7600 Oakwood Street Extension, Mebane, N.C. 27302 under the name Ensolite SFO. Ensolite SFO has a UL 94 HF-I rating for flame resistance and has a density of 3.5-5.5 lbs/ft$^3$, which has a typical 25% compression deflection value of 0.4 psi max. Ensolite SFO is a PVC/nitrile based crushed-cellular foam that is specially engineered to seal uneven materials. SFO is made as a close cell foam, then some of its cells are mechanically crushed to allow gasses out under pressure. This allows the Ensolite SFO to provide an effective seal, while contouring to different thicknesses of objects under different loads. Closed cell foams normally do not conform to abrupt gaps and are known to allow leaks. This does not occur with Ensolite SFO. The polymerized blends are soft foams that conform with a high degree of contouring to objects pressing on the surface of the foam. Ensolite SFO has a service temperature range of −40 degrees Fahrenheit to 200 degrees Fahrenheit and has good flammability ratings. Some latex forms have similar properties. In addition, a simple PVC foam, in some cases, has good conformity, but may lack fire retardance. Fire retardant may be applied to the surface of a PVC foam or latex foam or mixed with the PVC foam or latex foam to produce the desired level of fire retardation.

Figure 2:
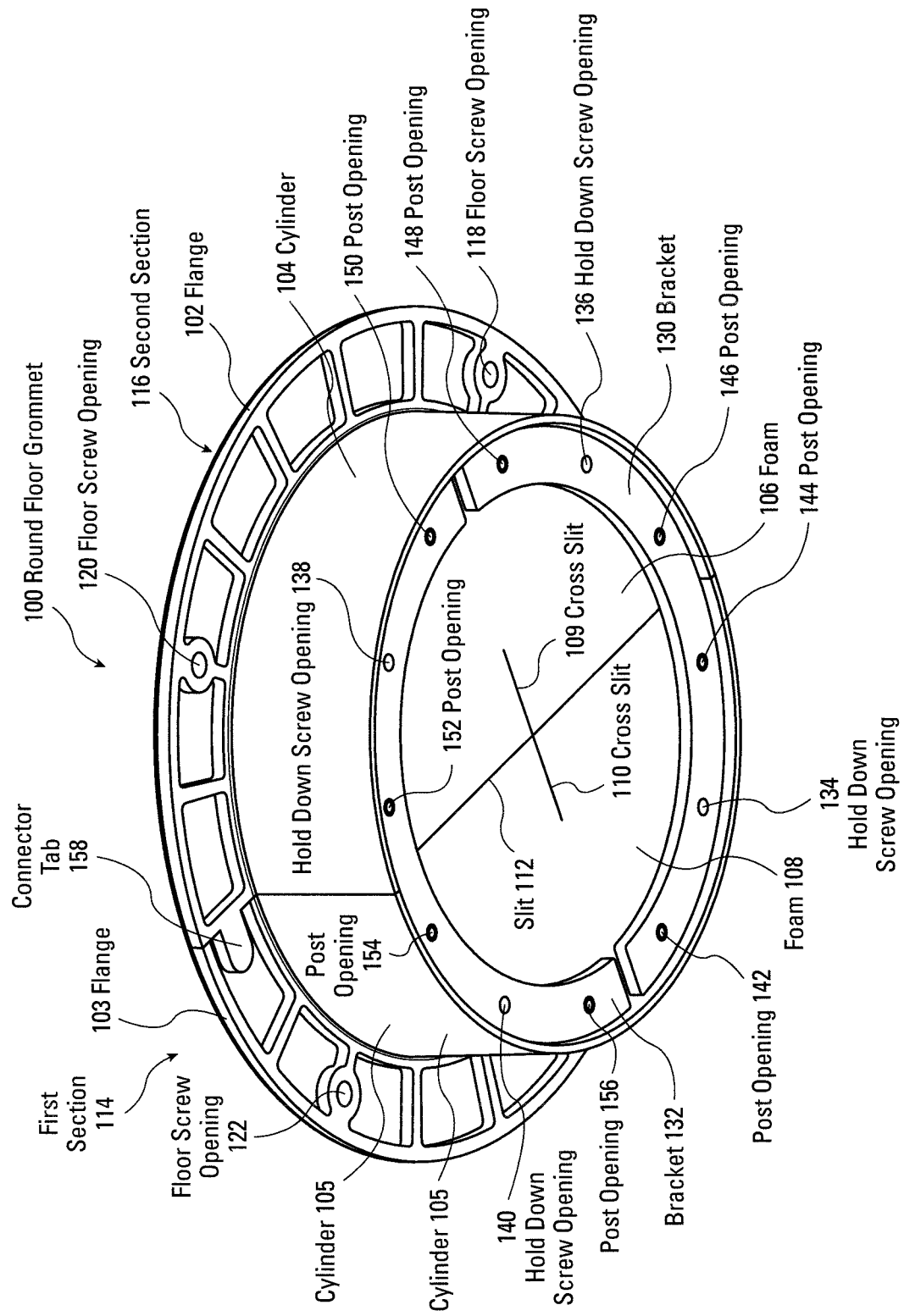
FIG. 2 is a bottom isometric view of the embodiment of FIG. 1.
Figure 4:
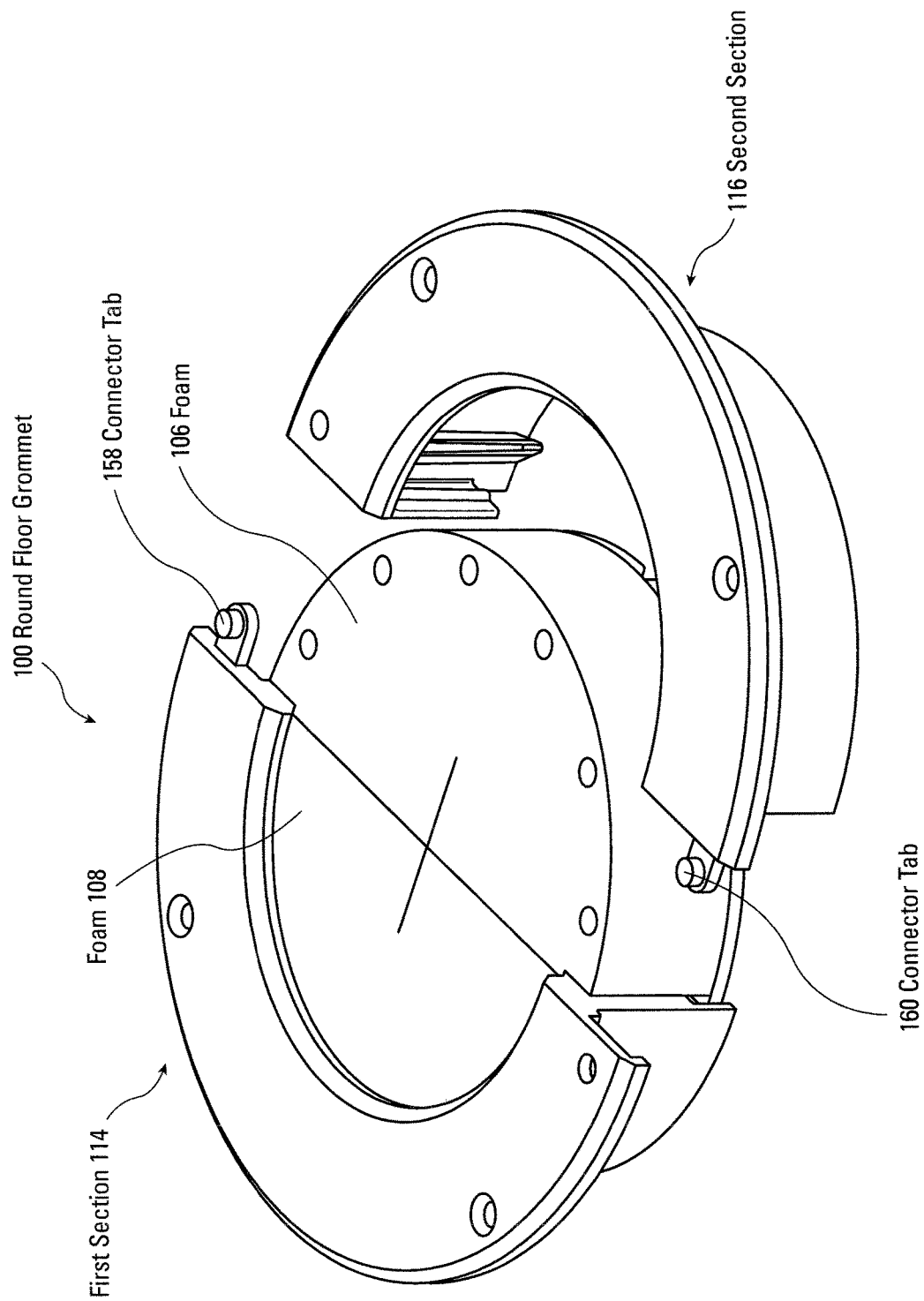
FIG. 4 is a top assembly view of the embodiment of FIG. 1.

FIG. 2 is a bottom isometric view of the embodiment of FIG. 1 of the round floor grommet 100. As illustrated in FIG. 2, flange 116 is coupled to the cylinder 104 and flange 103 is coupled to the cylinder 105. The flanges are connected by connector tab 158, illustrated is FIG. 2, and connector tab 160, is illustrated in FIG. 4. FIG. 2 also illustrates the floor screw openings 118, 120, 122. FIG. 2 also illustrates brackets 130, 132. Bracket 130 has post openings 142, 144, 146, 148 that engage a series of posts that align the bracket 130 with the cylinders 104, 105. Bracket 130 also has hold down screw openings 134,136 which allow screws to pass through and engage attachment posts, as disclosed below. Similarly, bracket 132 has post openings 150, 152, 154, 156 which align and secure the bracket 132 to the cylinders 104, 105 and also assist in holding the cylinders 104, 105 together in the assembled position, as illustrated in FIG. 2. Hold down screw openings 138, 140 allow the passage of screws through the bracket 132 which engage attachment posts in the manner disclosed below. The brackets 130, 132 assist in retaining the foam 106, 108 in the cylinders 104, 105. The slits 109, 110 are formed in foam pieces 108, 106 respectively. Slit 112 is formed by the joining of the foam pieces 106 and 108 in the cylinders 104, 105.

Figure 3:
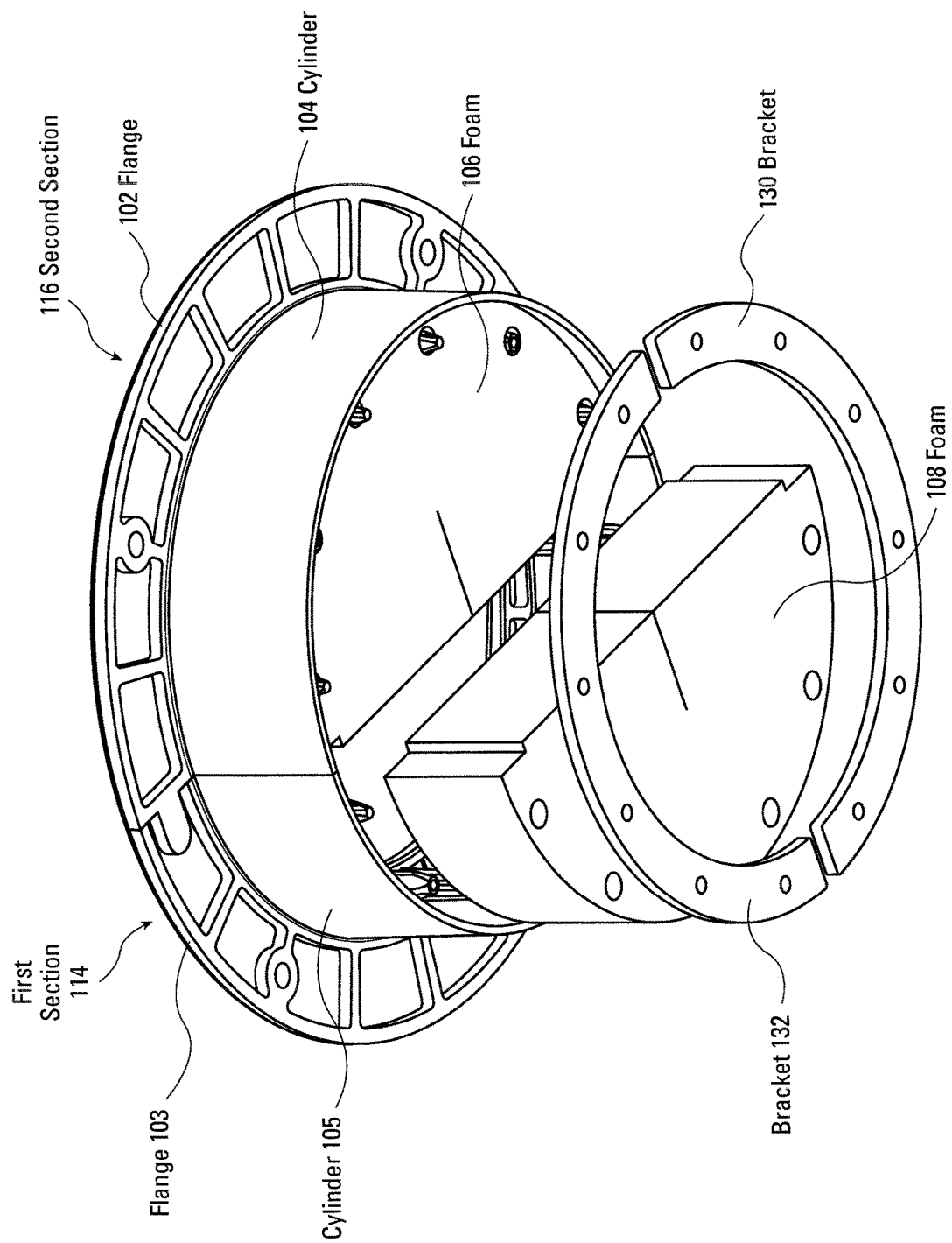
FIG. 3 is a bottom assembly view of the embodiment of FIG. 1.

FIG. 3 is a bottom exploded isometric view showing the assembly of the round floor grommet 100. As illustrated in FIG. 3, the frame 101 compresses the first section 114 and second section 116 that are joined together. Foam 106 is inserted in the cylinder 104 of the second section 116. Foam 108 is inserted in the first section 114. When foam 106 and foam 108 are mounted in second section 116 and first section 114, respectively, the brackets 130, 132 are placed over the foam to hold the foam in the cylinder 104 and cylinder 105. Flange 102 forms an integral part of the cylinder 104, while flange 103 forms an integral portion of the cylinder 105.

FIG. 4 is a top exploded view of the round floor grommet 100. The first section 114 and the second section 116 are joined together and held by connector tabs 158, 160. As disclosed below, the posts are inserted through openings in each of the foam pieces 106, 108 prior to joining the second section 116 to the first section 114.

Figure 5:
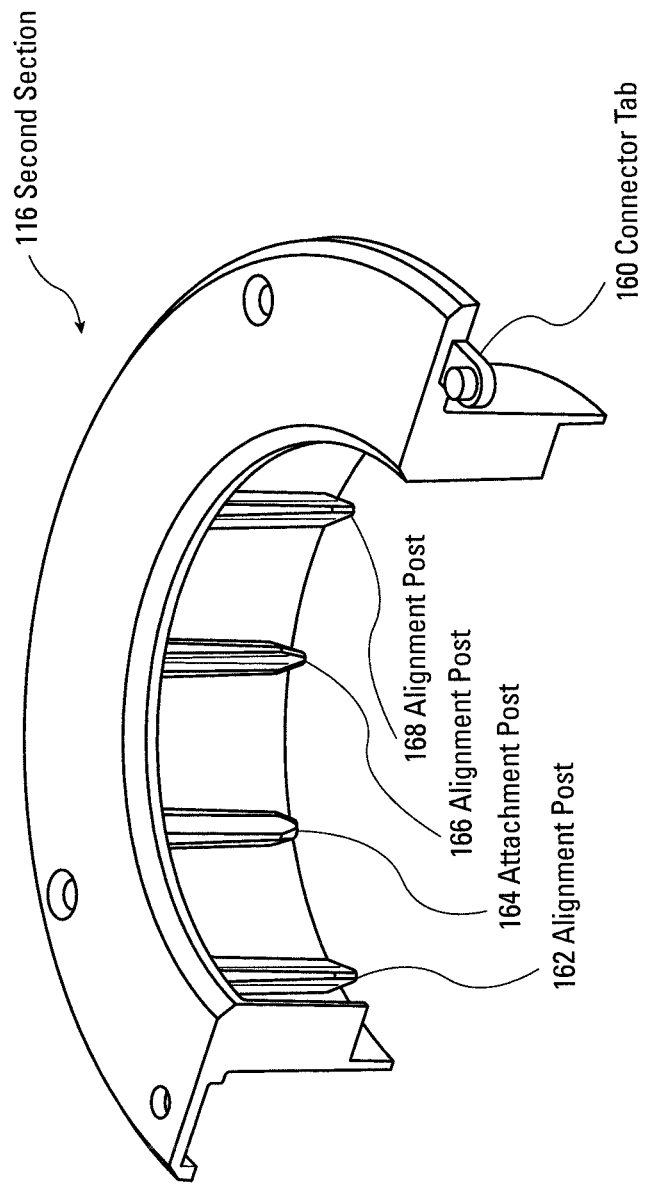
FIG. 5 is a top isometric view of the embodiment of the second section of the embodiment of FIG. 1.

FIG. 5 is a top isometric view of the second section 116. The second section 116 includes alignment posts 162, 166, 168 and an attachment post 164. FIG. 5 also illustrates the connector tab 160. These alignment posts 162, 166, 168 and attachment post 164 penetrate through openings in the foam piece 106.

Figure 6:
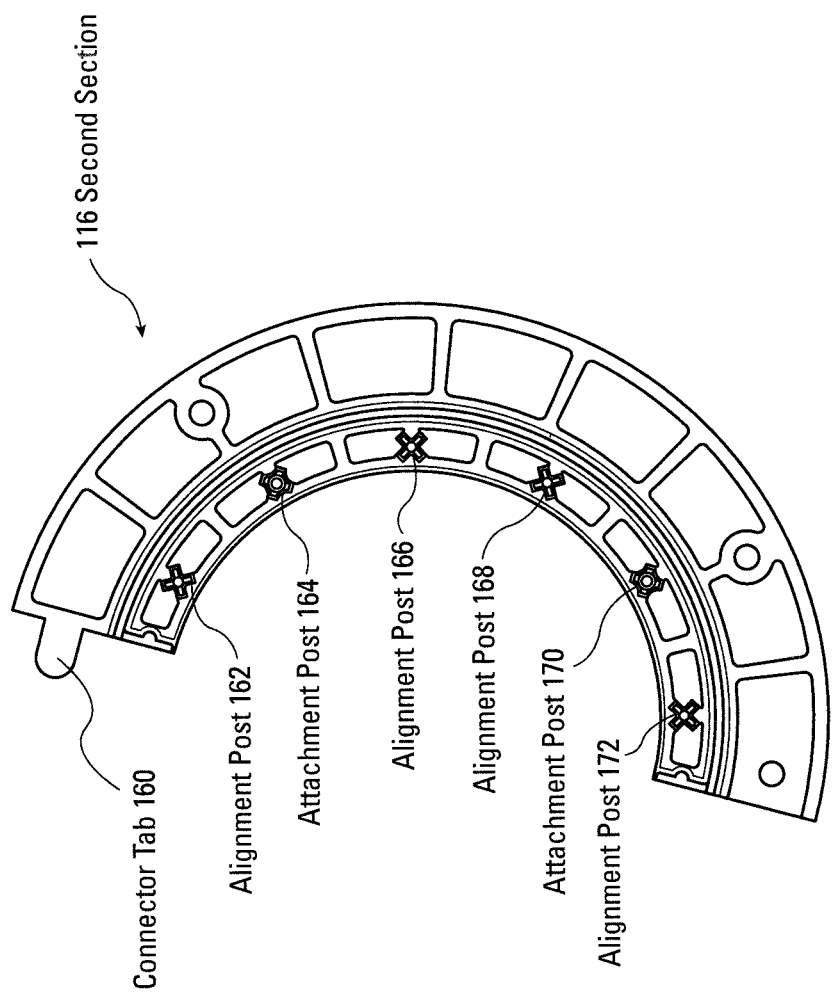
FIG. 6 is a bottom view of a second section of the embodiment of FIG. 1.

FIG. 6 is a bottom view of the second section 116. FIG. 6 illustrates alignment posts 162, 166, 168, 172. FIG. 6 also illustrated the attachment posts 164, 170 which are adapted to receive a screw to secure the brackets to the second section 116.

Figure 7:
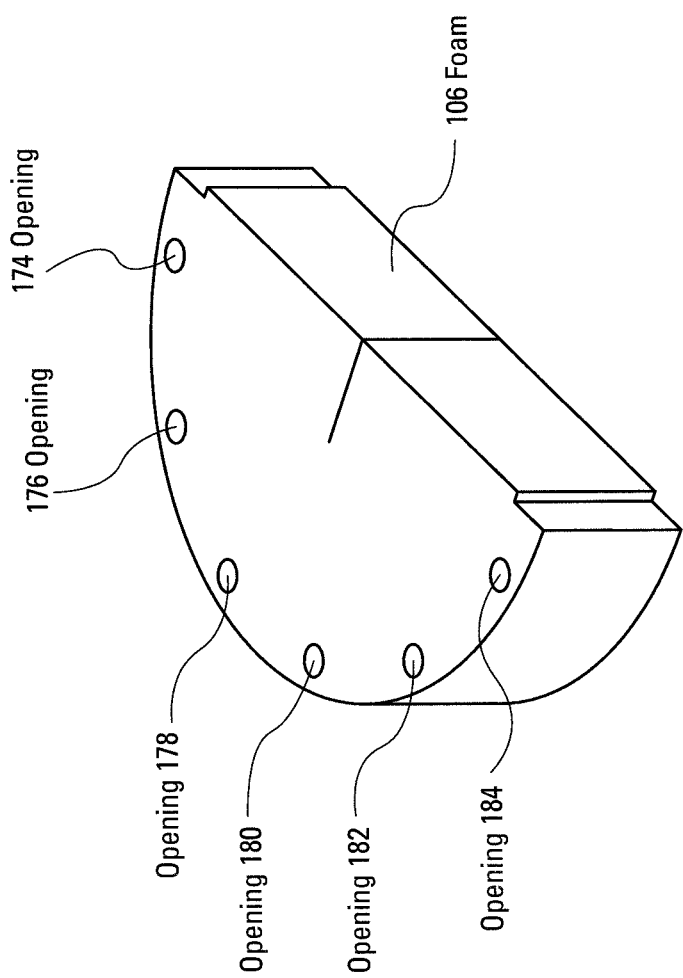
FIG. 7 is a top isometric view of one section of the foam of the embodiment of FIG. 1.

FIG. 7 is an isometric view of the foam piece 106. The foam piece has a series of openings 174, 176, 178, 180, 182, 184. Openings 174-184 may be dye cut or formed in any desired fashion including various methods of cutting the foam 106. Foam piece 106 has similar openings.

Figure 8:
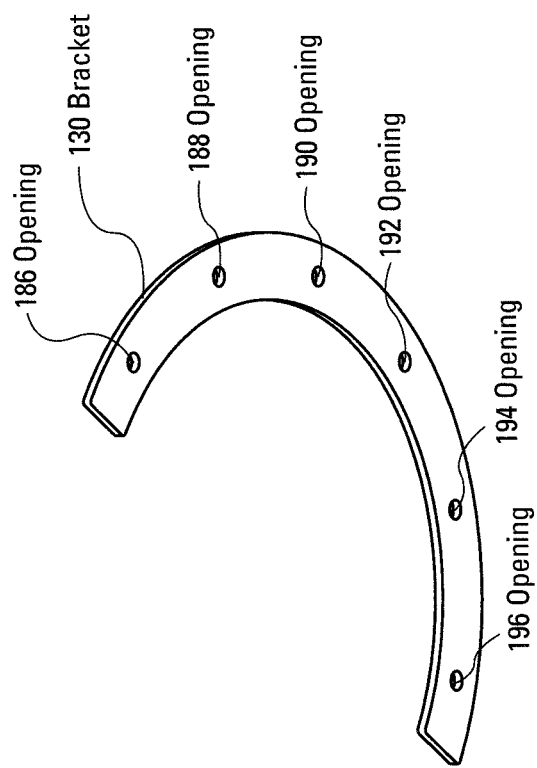
FIG. 8 is an isometric view of a bracket of the embodiment of FIG. 1.

FIG. 8 is an isometric view of bracket 130. Bracket 130 has a series of openings 186, 188, 190, 192, 194, 196. Openings 186-196 correspond to the openings 174-184, illustrated in FIG. 7 and alignment post 162, attachment post 164, alignment post 166, 168, attachment post 170 and alignment post 172. The second section is assembled by placing the foam member 106 so that the openings 174, 184 are aligned with the posts 162, 172. Bracket 130, illustrated in FIG. 8, is then placed over a portion of the post so that the openings 186, 196 are aligned with the various posts 162, 172 to locate and secure the bracket 130 in a proper location so that the bracket 130 holds the foam piece 106 in place. In accordance with one embodiment, the bracket 130 engages three of the posts in the second section 116 and three of the posts in the first section 114. In that instance, bracket 132 (FIG. 3) engages three of the posts of second section 116 and three of the posts of first section 114. In this manner, the bottom portion of the cylinders 104, 105 are held together by the brackets 130, 132.

Figure 9:
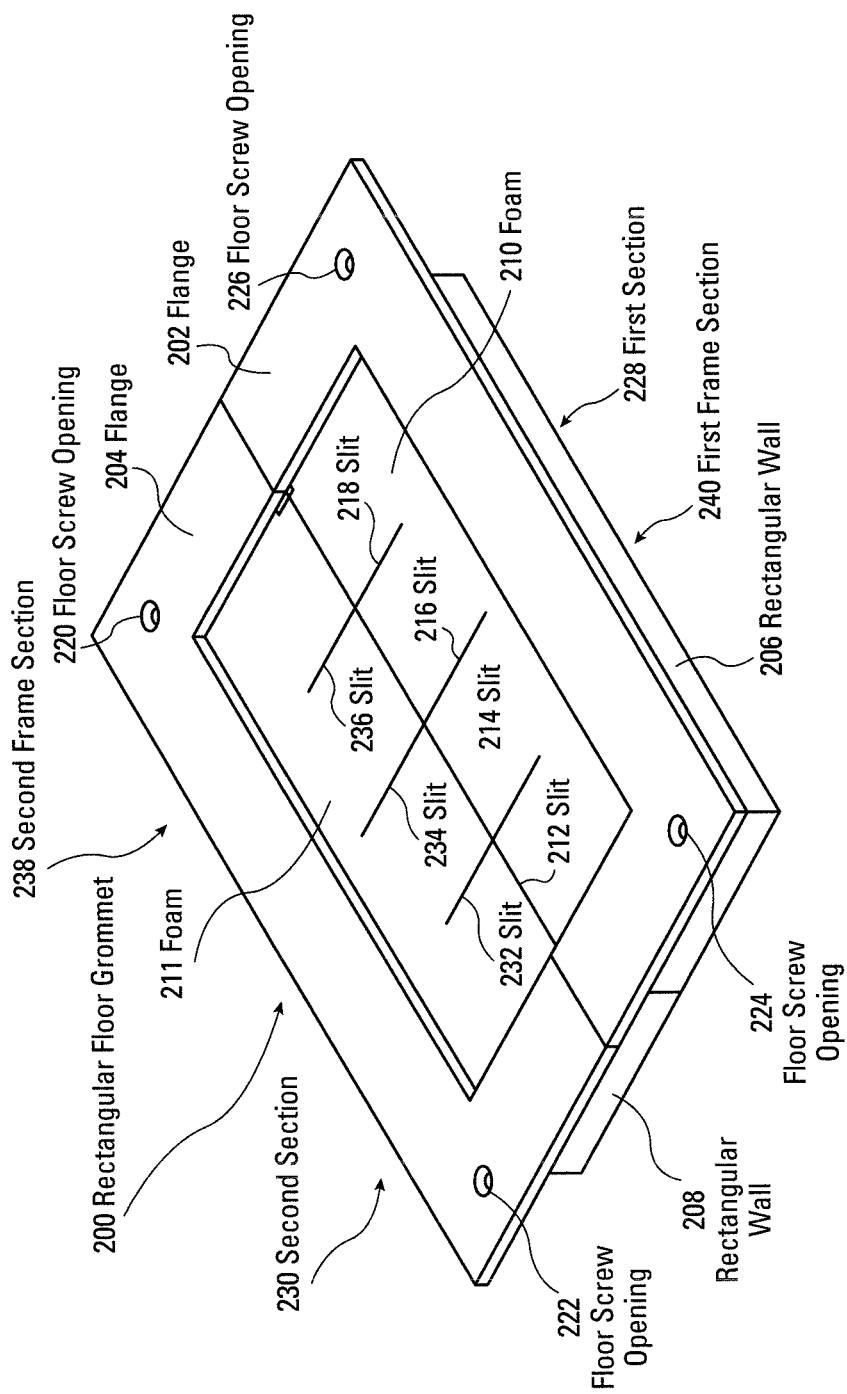
FIG. 9 is a top isometric view of another embodiment of the present invention.

FIG. 9 is a top isometric view of an embodiment of a rectangular floor grommet 200. The rectangular floor grommet 200, illustrated in FIG. 9, has a first section 228 and a second section 230. First section 228 holds a first foam piece 210, while second section 230 holds a second foam piece 211. First frame section 240 comprises flange 202 and the rectangular wall 206. The second frame section 238 comprises the flange 204 and the rectangular wall 208. In the first section 228 a flange 202 and a rectangular wall 206 can be formed together as a unitary structure such as a single molded piece. The flange 202 and the rectangular wall 206 can also be constructed as separate pieces and later glued or welded together, also. The foam piece 210 comprises a portion of the first section 228 which includes a series of slits 212, 214, 216, 218. Similarly, second section 230 comprises a flange 204 and rectangular wall 208 that are a unitary structure. Again, the flange 204 and the rectangular wall 208 can also be constructed separately and glued or welded together. The structural members of the rectangular floor grommet 200 are preferably constructed from a plastic material that has a sufficient strength and a sufficient thickness to provide a durable rectangular floor grommet 200. Foam 211 has a series of cross slits 232, 234, 236 which are referred as slits, in FIG. 9, for purposes of brevity. When the first section 228 is mated with the second section 230, the slit 212 is formed that extends the entire length of both foam pieces 210, 211. Flanges 202, 204 include floor screw openings 220, 222, 224, 226.

Figure 10:
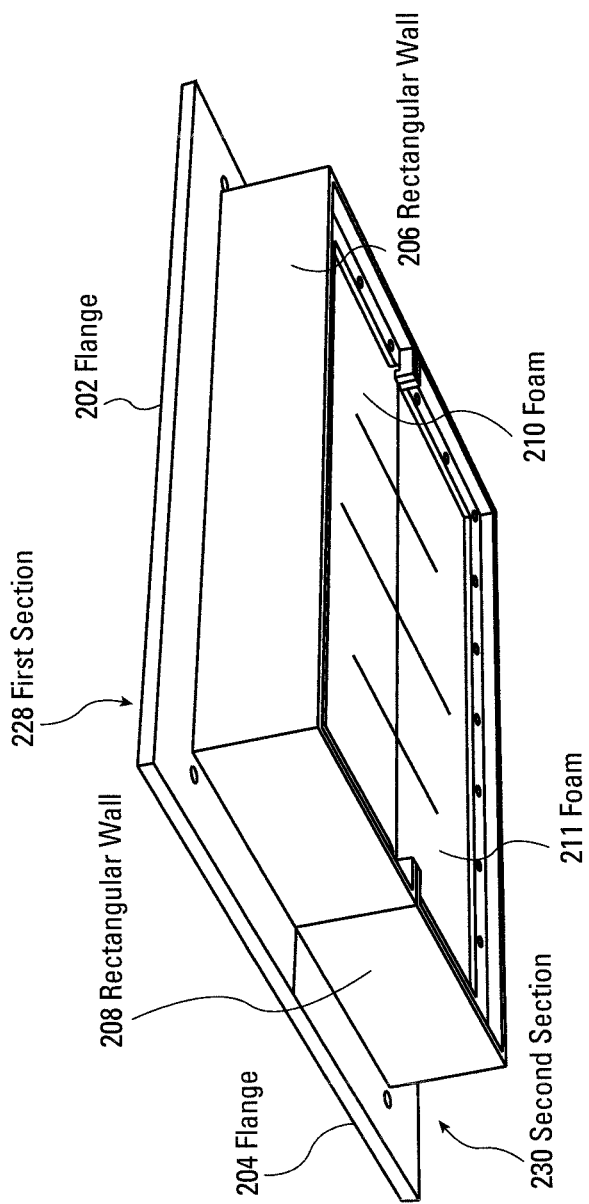
FIG. 10 is a bottom isometric view of the embodiment of FIG. 9.

FIG. 10 is a bottom isometric view of the embodiment of FIG. 9. As illustrated in FIG. 10, first section 228 comprises flange 202, rectangular wall 206 and foam 210. Second section 230 comprises flange 204, rectangular wall 208 and foam 211.

Figure 11:
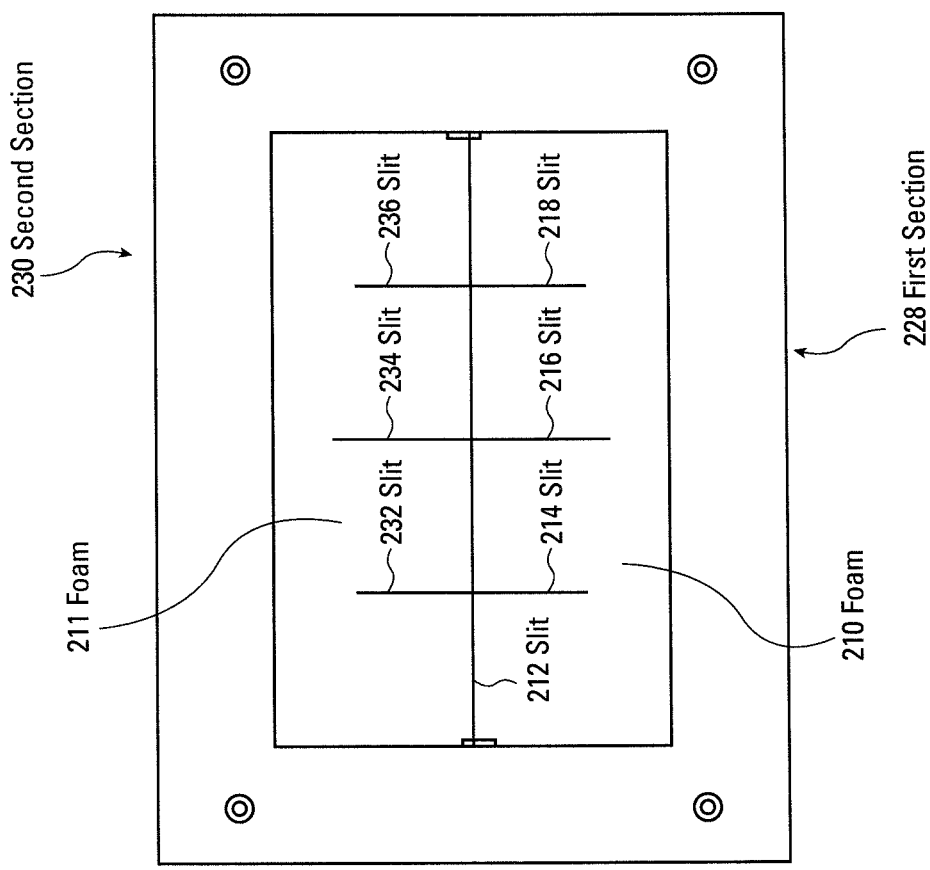
FIG. 11 is a top view of the embodiment of FIG. 9.

FIG. 11 is a top view of the embodiment of FIG. 9. As illustrated in FIG. 11, first section 228 includes foam 210, having slits 214, 216, and 218. These slits extend through the entire depth of the foam 210. Second section 230 includes foam 211 having slits 232, 234, 236 which also extend through the entire depth of 211. As indicated above, slit 212 is formed when the first section 228 and the second section 230 are joined together.

Figure 12:
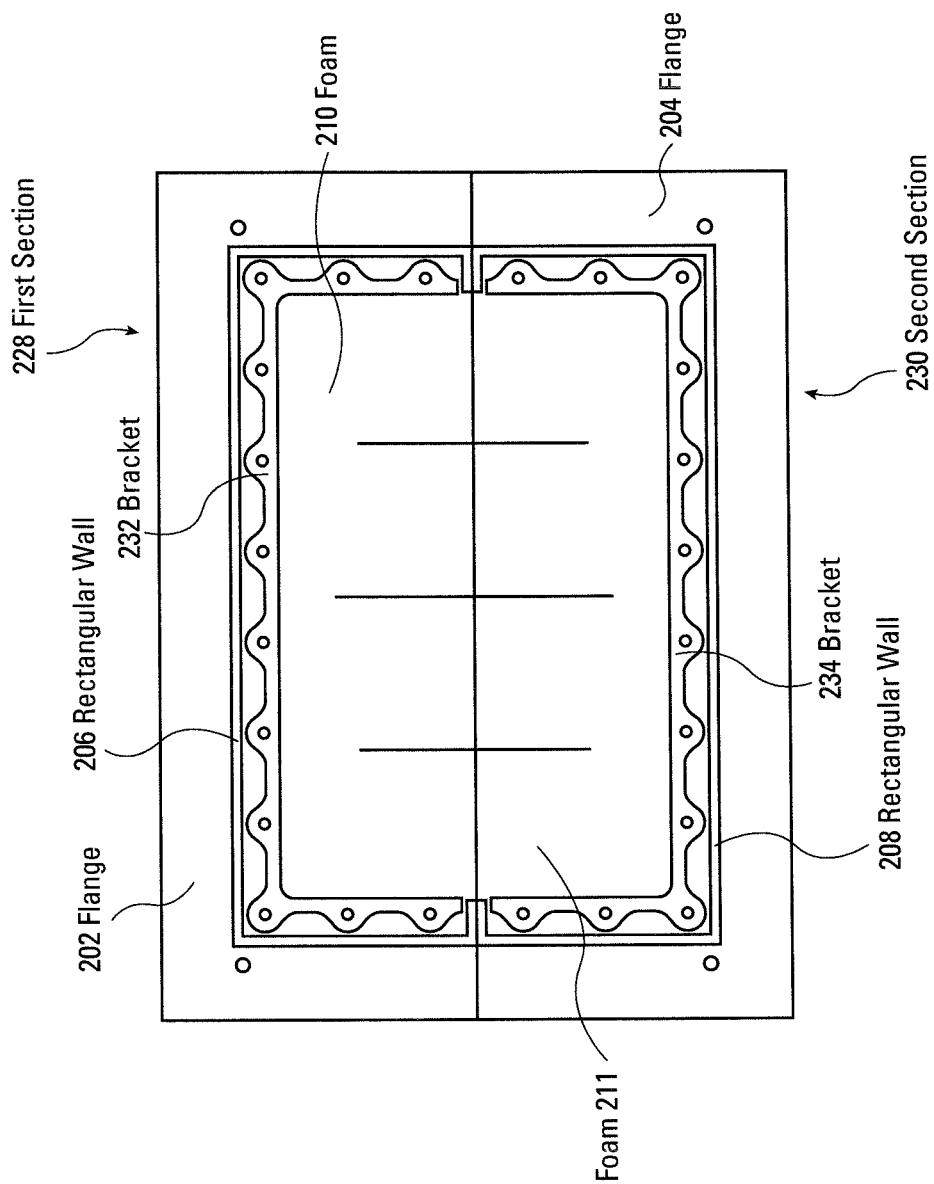
FIG. 12 is a bottom view of the embodiment of FIG. 9.

FIG. 12 is a bottom view of the embodiment of FIG. 9. As illustrated in FIG. 12, first section 228 includes flange 202, rectangular wall 206 and foam 210. The second section 230 includes flange 204, rectangular wall 208 and foam 211. Brackets 232, 234 are attached to posts that both align and hold the brackets 232 and 234 in place so that the brackets 232 and 234 can hold the foam 210, 211 in place. Although the brackets 232, 234 are shown as being placed only in the first section 228 and second section 230, respectively, these brackets can be constructed to overlap first section 228 and second section 230 to hold the bottom portion of the rectangular floor grommet 200 together. Although not illustrated, connector tabs, such as illustrated in the embodiment on FIG. 1 can be used to hold the top portion of the first section 228 and second section 230, together.

Figure 13:
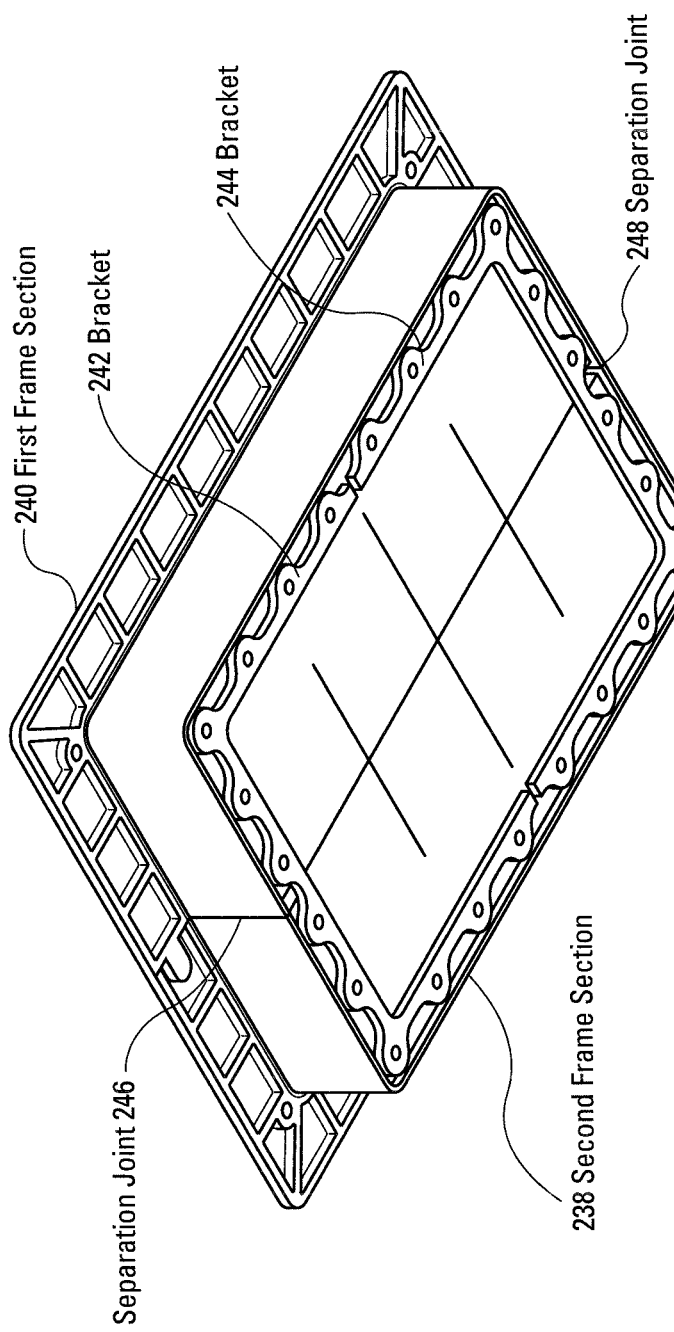
FIG. 13 is a bottom isometric view of the embodiment of FIG. 9.

FIG. 13 is a bottom isometric view of the embodiment of FIG. 9. As illustrated in FIG. 13, bracket 242 spans the separation joint 246 so that the first frame section 240 and the second frame section 238 are held together along the bottom portions of the first frame section 240 and the second frame section 238. Similarly, bracket 244 spans the separation joint 248 and holds together the first frame section 240 and the second frame section 238 along the bottom portion of the first frame section 240 and the second frame section 238.

Figure 14:
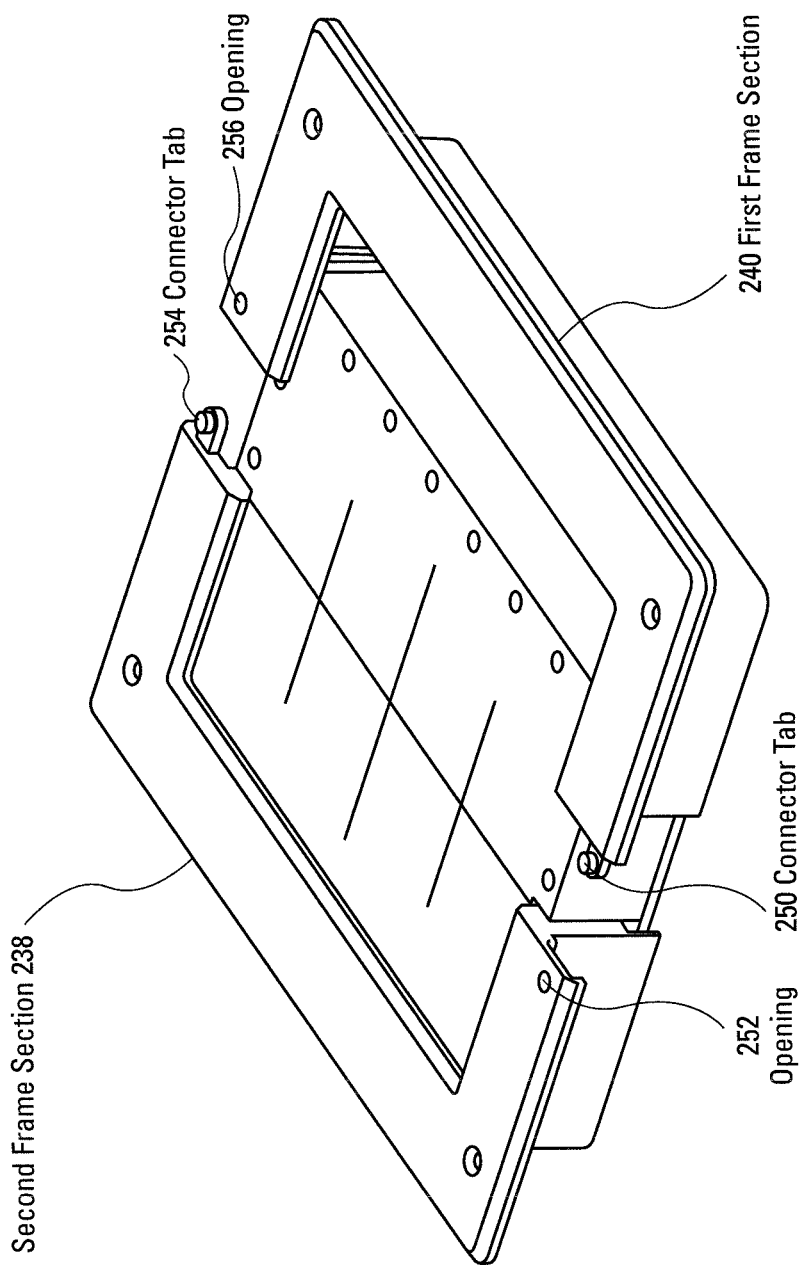
FIG. 14 is a top isometric exploded view of the embodiment of FIG. 9.

FIG. 14 is an isometric exploded view of the rectangular grommet illustrated in FIG. 9. As shown on FIG. 14, connector tab 250 on the first frame section 240 engages opening 252 to hold the first frame section 240 to the second frame section 238 along the top portion of first frame section 240 and second frame section 238. Similarly, connector tab 254 engages opening 256 to hold to hold the first frame section 240 to the second frame section 238 along the top portion of the frame sections on an opposite side of the frame sections.

Figure 15:
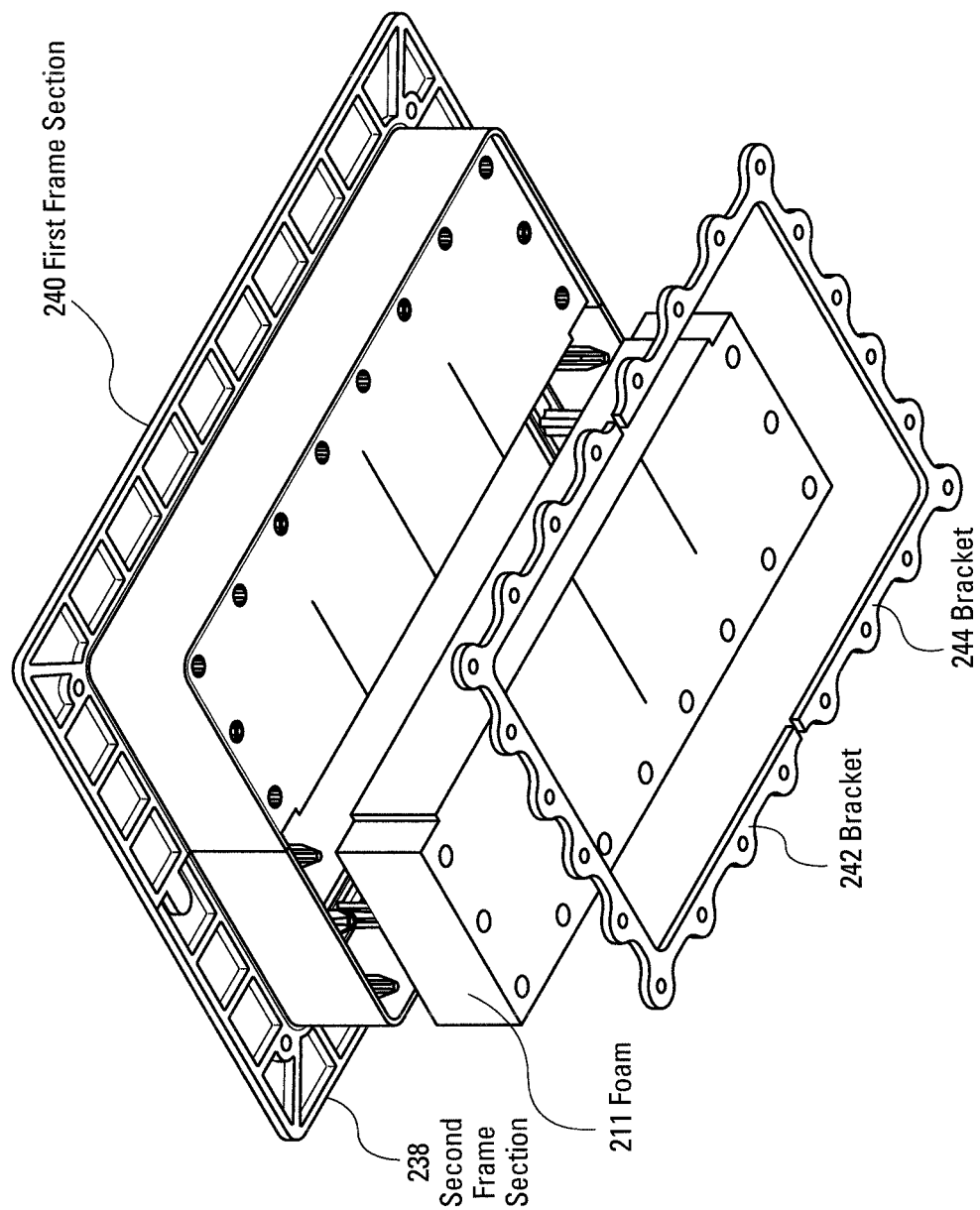
FIG. 15 is a bottom isometric exploded view of the embodiment of FIG. 9.

FIG. 15 is a bottom isometric exploded view of the rectangular floor grommet illustrated in FIG. 9. As shown in FIG. 15, foam 211 is inserted into the second frame section 238 and brackets 242, 244 engage the bottom portion of the first frame section 240 and the second frame section 238 to hold the foam 211 in place.

Figure 16:
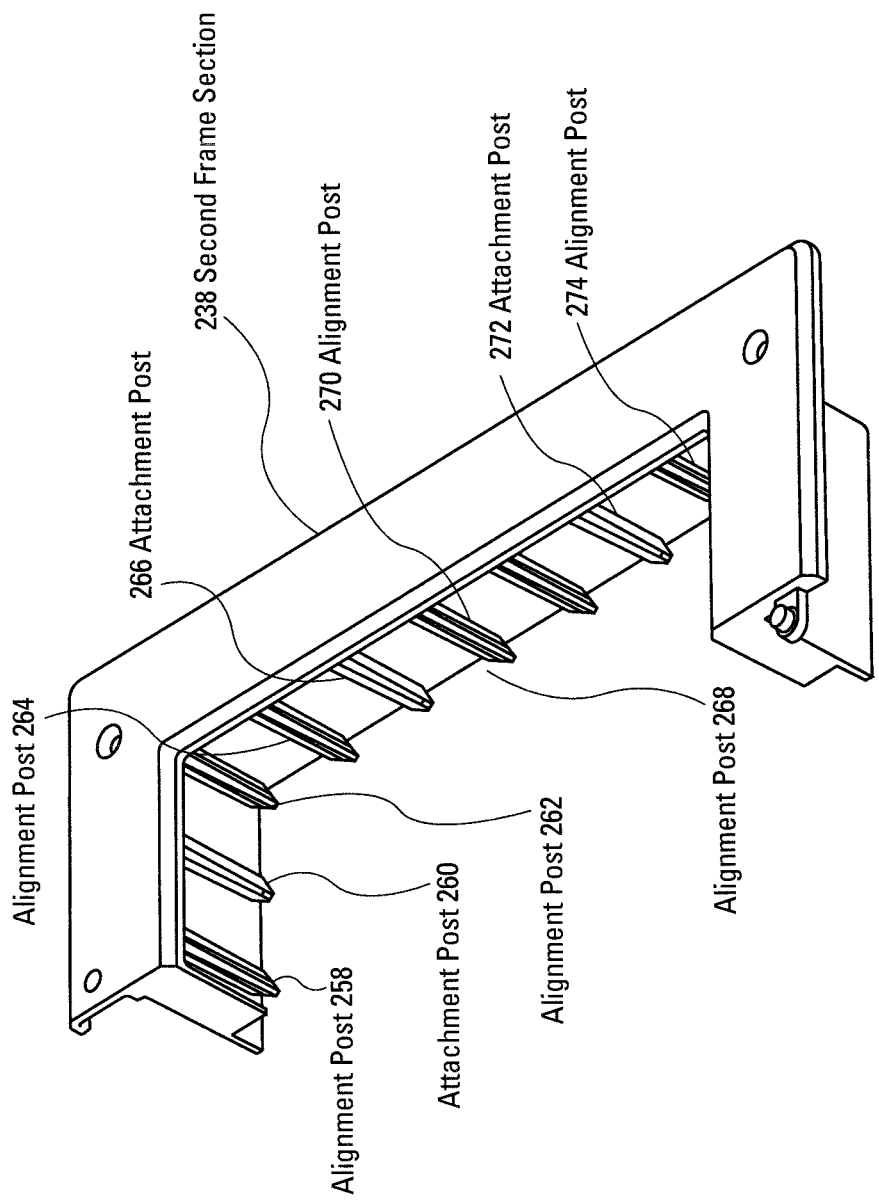
FIG. 16 is a top isometric view of the second frame section.

FIG. 16 is an isometric top view of the second frame section 238. As illustrated in FIG. 16, a series of posts 258-274 are connected to the second frame section 238. These posts engage the openings in foam 211 to position and hold the foam 211 in the second frame section 238.

Figure 17:
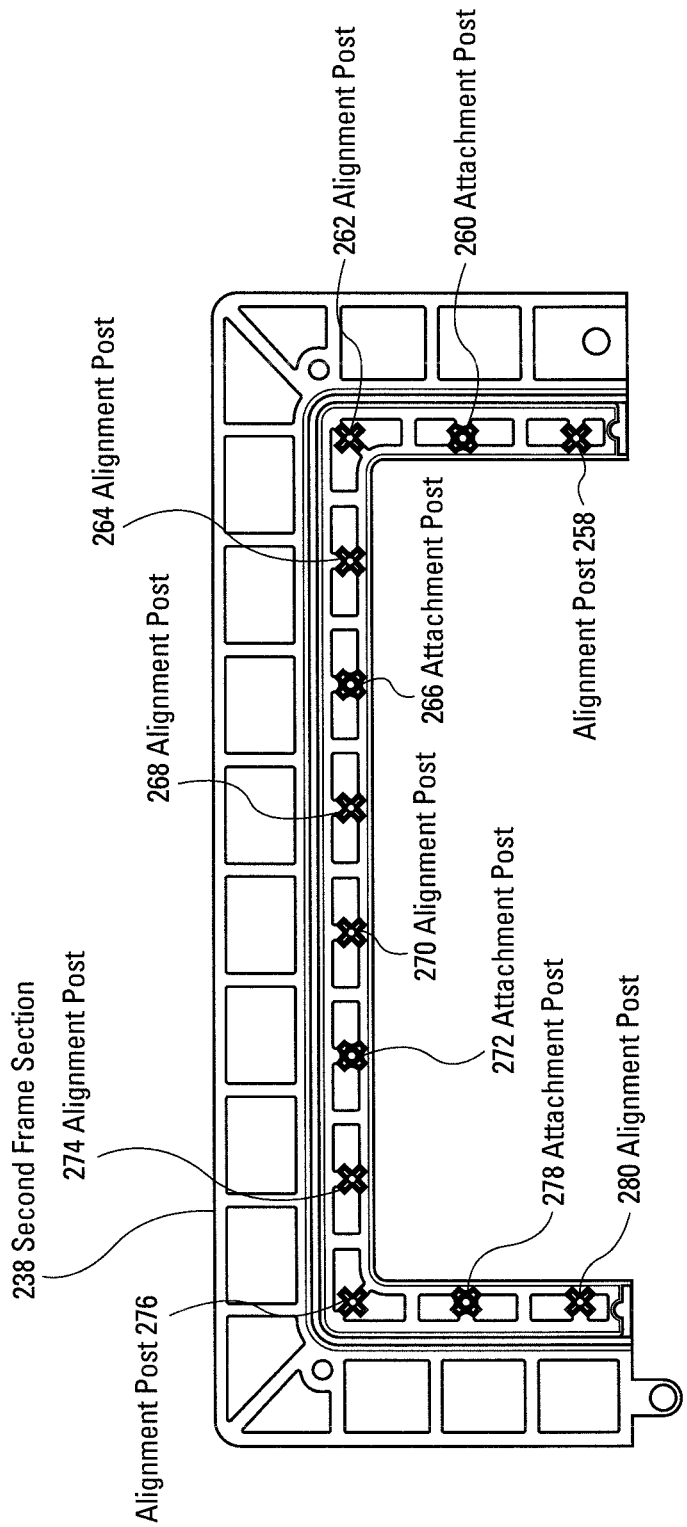
FIG. 17 is a bottom view of the second frame section.

FIG. 17 is a bottom view of the second frame section 238. As illustrated in FIG. 17, alignment posts 258, 262, 264, 268, 270, 274, 276, and 280 engage to the openings in the foam member 211. The alignment posts position the foam member in the second frame section 238. Attachment posts 260, 266, 272, and 278 have openings for a connector to engage the attachment posts to connect the brackets 242, 244 to the second frame section 238. Similar attachment posts and alignment posts are provided on the first frame 240 which engage the foam 210.

Figure 18:
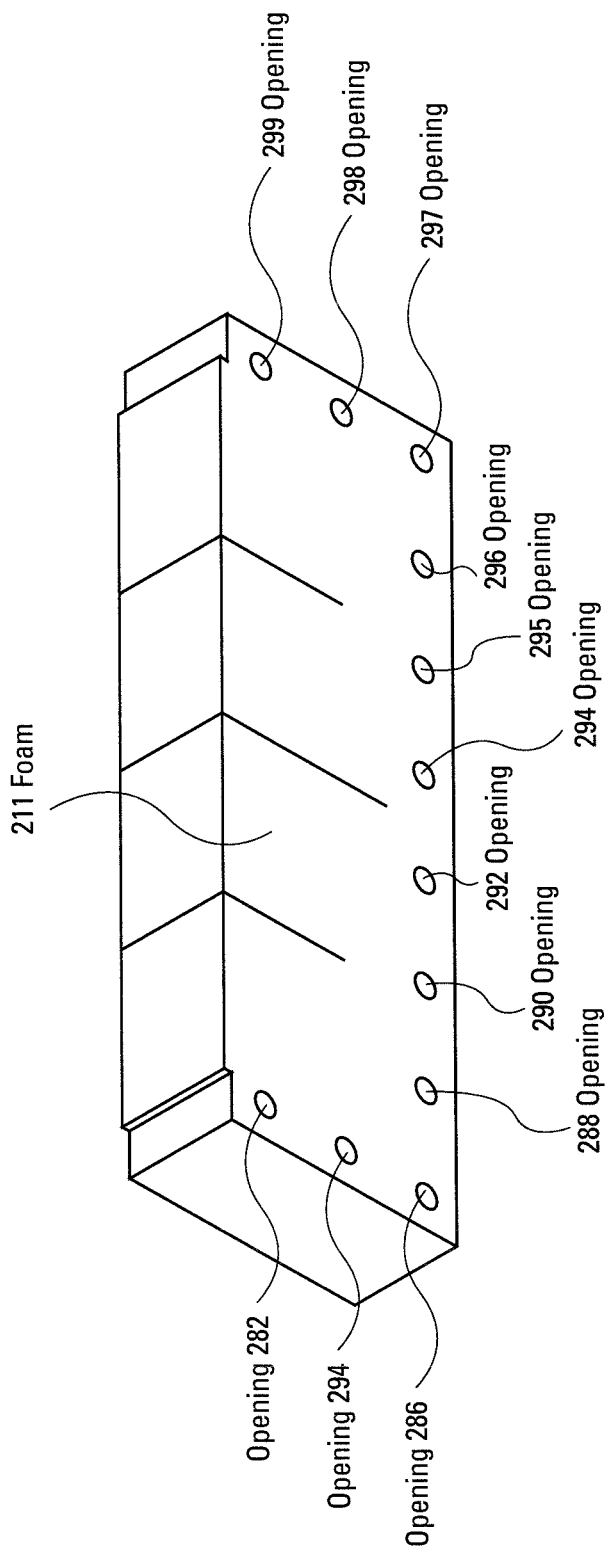
FIG. 18 is an isometric view of a foam member.

FIG. 18 is an isometric view of foam member 211. Foam 211 has openings 282, 284, 286, 288, 290, 292, 294, 295, 296, 297, 298, and 299. These openings engage the posts 258-280 disclosed in FIG. 17. In this manner, foam 211 is held and secured to the second frame section 238.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of providing access through a floor tile of a raised floor system to allow passage of cables between a plenum and a computer room while restricting the flow of air comprising:
   providing a frame having a first section and a second section;
   attaching a first foam member to said first section, said first foam member comprising a polymerized blend of polyvinylchloride and nitrile butadiene rubber that is foamed and treated to form a semi-closed foam;
   attaching a second foam member to said second section, said second foam member comprising a polymerized blend of polyvinylchloride and nitrile butadiene rubber that is foamed and treated to form a semi-closed foam;
   connecting said first section and said second section so that said first section foam member abuts against said second section foam member to form an access that allows passage of said cables while restricting flow of air through said access.

2. The method of claim 1 wherein said first foam member and said second foam member comprise a polymerized blend of polyvinylchloride, nitrile butadiene rubber and polychloroprene.

3. The method of claim 1 wherein said method of attaching said first foam member to said first section comprises:
   placing posts attached to said first section through holes formed in said first foam member.

4. The method of claim 3 wherein said method of attaching said second foam member to said second section comprises:
   placing posts attached to said second section through holes formed in said second foam member.

5. The method of claim 4 wherein said method of connecting said first section and said second section comprises:
   using tab connectors disposed on a flange of said frame to connect a flange of said frame.

6. The method of claim 4 wherein said method of connecting said first section and said second section comprises:
   using at least one bracket coupled to said posts of said first section and said second section.

7. The method of claim 4 further comprising:
   cross slits formed in said first foam member and said second foam member that allow deflection of said first foam member and said second foam member and conformance of said first foam member and said second foam member around an object inserted through said first foam member and said second foam member.

* * * * *